United States Patent [19]
Sowma

[11] 3,758,148
[45] Sept. 11, 1973

[54] CONVERTIBLE CAMPER
[76] Inventor: Julia A. Sowma, 1947 Vista Del Mar, Hollywood, Calif. 90028
[22] Filed: Jan. 24, 1972
[21] Appl. No.: 220,145

[52] U.S. Cl. ........................ 296/23 MC, 296/137 B
[51] Int. Cl. .............................................. B60p 3/32
[58] Field of Search .................. 296/23, 26, 23 MC, 296/137 B

[56] References Cited
UNITED STATES PATENTS
3,403,935 10/1968 Spradling .......................... 296/23 R
3,190,689 6/1965 Calthorpe ...................... 296/137 B

*Primary Examiner*—Philip Goodman
*Attorney*—Robert Berliner

[57] ABSTRACT

A camper having enclosing walls and a roof which define an openable air compartment. A terminal portion is displaced with respect to the roof so as to expose the air compartment. The terminal portion may be releasably secured to the roof at one end and hinged at the other end so as to enable movement of the terminal portion with respect to the roof. The open-air compartment may be the cab-over portion of a camper. Moreover, the side walls of the compartment may also be made movable.

6 Claims, 4 Drawing Figures

PATENTED SEP 11 1973
3,758,148
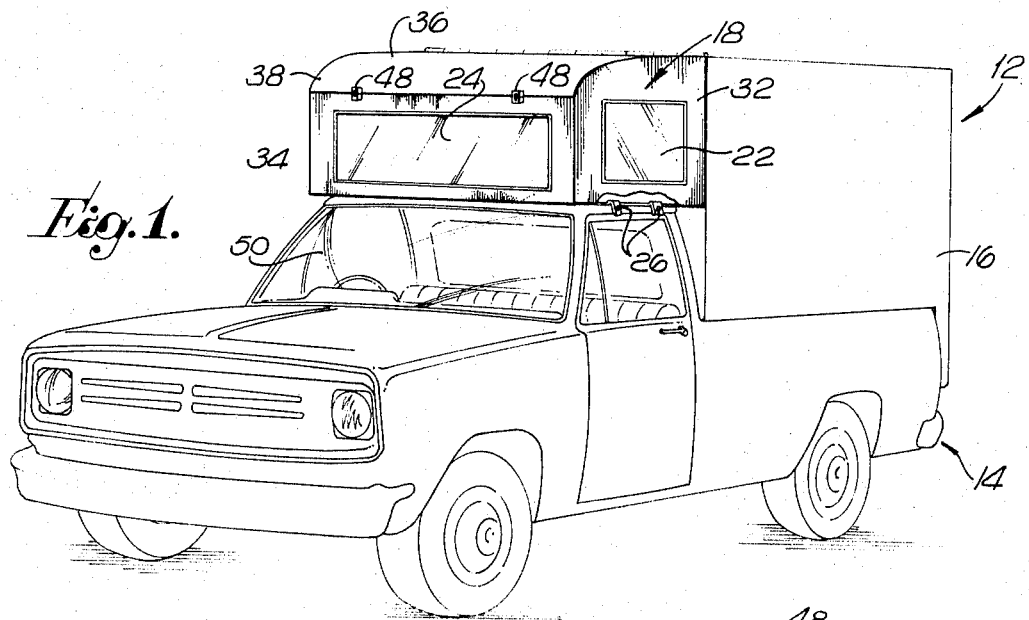
Fig.1.
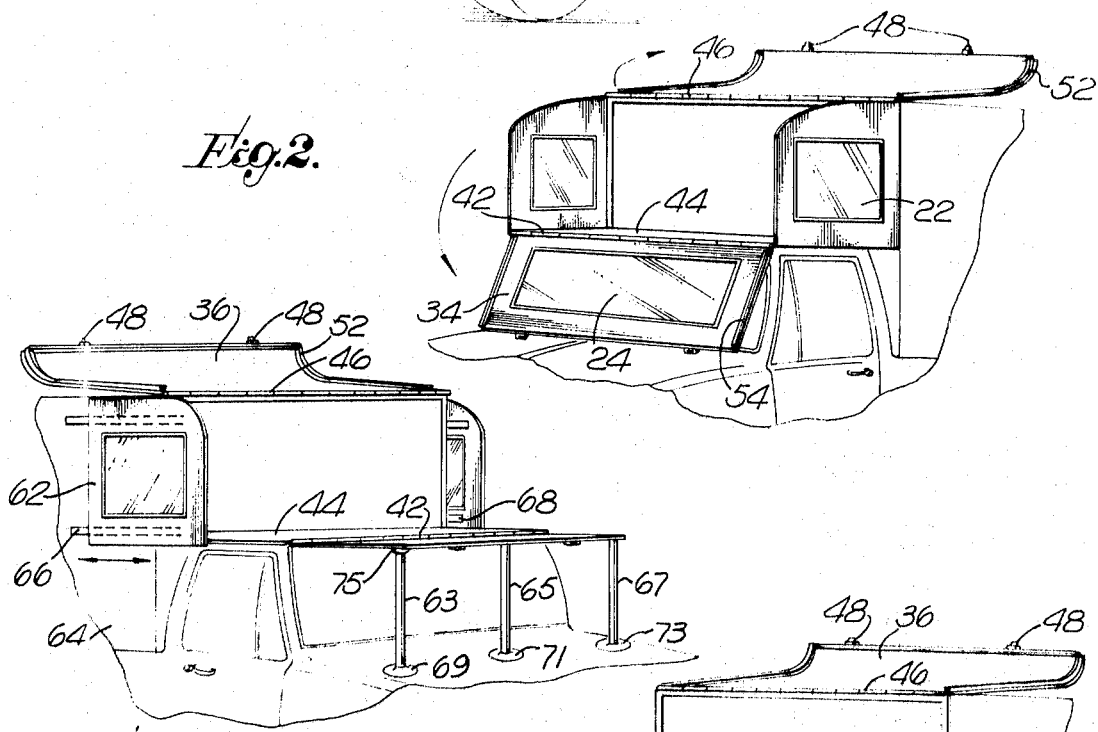
Fig.2.
Fig.3.
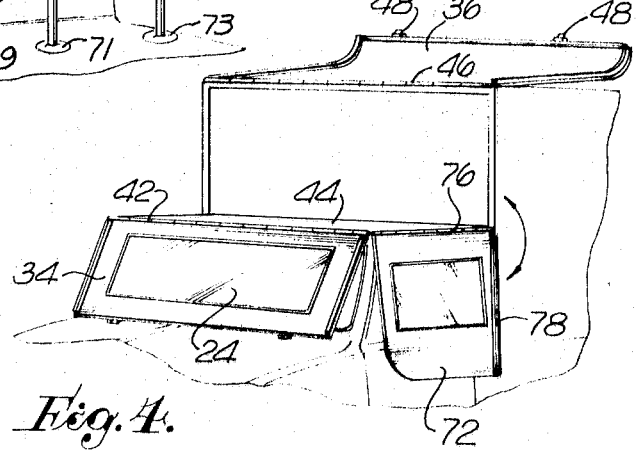
Fig.4.

CONVERTIBLE CAMPER

FIELD OF THE INVENTION

The field of art to which the invention pertains includes the field of campers.

BACKGROUND OF THE INVENTION

In conventional campers, particularly those of the slide-in or chassis mounted variety, wherein the camper is positioned on a truck body, it is necessary to maximize the use of all space in the campers. The most popular design of the campers which are mounted on truck bodies have utilized a cab-over portion which extends over the top of the cab of the vehicle. This portion of the camper necessarily has a reduced height and thus can function for only limited use. The most popular use of this space, that is, the cab-over portion of the camper has been to provide a double bed therein. While windows can normally be provided for ventilating this space, it has been found that when camping in warm climates a maximum amount of windows must be provided for proper ventilation. Alternatively, it has been found that to provide too many windows in the cab-over portion would result in a dangerous structural situation wherein the windows themselves would not provide proper structure for the area in case of an accident. Moreover, when the vehicle is in use, a maximum amount of glass can result in damage to the vehicle by loose rocks or other objects in the area. Thus, the need for proper ventilation in the cab-over portion has been compromised because of safety requirements of the camper vehicles.

SUMMARY OF THE INVENTION

In order to overcome the attendant disadvantages of prior art campers which utilize a cab-over portion for sleeping, the present invention provides a maximum amount of ventilation in the vehicle. Moreover, when the weather is not warm or the cab-over portion is not in use for sleeping, the structural elements of the cab-over portion of the camper are sufficiently rigid to provide a desirable camper structure. Thus, the present invention provides a structurally safe convertible camper, wherein the cab-over portion may be readily opened for use in warm or hot weather. The invention applies to any vehicle, including campers, trailers, mobile homes, and the like, which are all referred to as "accommodation" vehicles.

More particularly, the invention comprises a convertible camper having enclosing walls and a roof which defines an open-air compartment. A terminal portion is displaced with respect to the roof so as to define an open air compartment. The terminal portion may be releasably secured to the roof at one end and hinged at the other end so as to enable movement of the terminal portion with respect to the roof. The open-air compartment may be the cab-over portion of a camper. Moreover, the side walls of the compartment may also be movable.

The advantages of the invention, both as to its construction and mode of operation, will be readily appreciated as the same becomes better understood by reference to the following detailed description when considered in connection with the accompanying drawings, in which like reference numerals designate like parts throughout the figures.

BRIEF DESCRIPTION OF THE DRAWINGS

FIG. 1 depicts a convertible camper which is mounted on a conventional pickup truck or other vehicle;

FIG. 2 illustrates the convertible camper of FIG. 1 with a compartment of the camper exposed;

FIG. 3 shows an alternative embodiment of a convertible camper; and

FIG. 4 depicts still another embodiment of convertible camper.

DESCRIPTION OF THE PREFERRED EMBODIMENTS

Referring now to the drawings there is shown in FIG. 1 a convertible camper 12 made in accordance with the principles of the invention. The camper is mounted on a pickup truck 14 in a slide-in fashion as is conventional. Alternatively, of course, it should be understood that the camper could be of the chassis mounted or other similar conventional variety. The camper 12 contains a generally box-shaped rear section 16 and a cab-over section 18 which extends from the rear section over the passenger cab compartment of the pickup truck 14. As is conventional, the cab-over section 18 normally contains a double bed which extends somewhat into the rear section 16. The cab-over section may also contain windows such as side windows 22 and a front window 24 which may be opened and contain screening if desired. These windows normally provide the major source of ventilation for the occupants of the double bed in the cab-over section.

When the cab-over section is utilized as a double bed the weight of the occupants normally will tend to push the cab-over section 18 down towards the passenger compartment roof on the pickup truck. Therefore, it is necessary to provide a plurality of rubber guards 26 between the bottom of the cab-over section and the top of the passenger cab compartment of the pickup vehicle. While two guards 26 are shown, it should be understood, of course, that more guards could be used if needed. Alternatively, of course, it should be understood that other types of guards could be used between the bottom of the cab-over section and the top of the passenger cab compartment.

To allow the occupants of the cab-over section 18 to have fresh air when it is unusually warm or hot when on a camping trip and the occupants thereof are sleeping, the present invention allows the cab-over section to be opened and thereby expose the section to fresh air. The cab-over section 18 is formed of side walls 32 having windows 22 positioned therein and a front or terminal wall 34 having a window 24 positioned therein. The top wall 36 of the cab-over section is normally flat near its junction with the roof of the rear section and curves near its front end 38 where it mates with the front section 34. Alternatively, the top wall 36 and the front wall 34 would be joined at right angles with the front curved portion 38 eliminated.

To allow opening of the cab-over section of the camper, the bottom edge of the front section 34 is hinged as at 42 by means of a conventional piano type hinge or other arrangement with the bottom surface 44 of the cab-over section as shown in FIG. 2. The rear edge of the top wall 36 of the cab-over section is hinged by means of a hinge 46 to allow the top section 36 to be pivoted in a manner shown in FIG. 2. To allow the top wall 36 and the front wall 34 to be secured together, latches 48 are provided at the free ends thereof. Rubber gaskets 52 are provided on the inner side surfaces of the top wall 36 so as to provide a weather seal between the top wall 36 and the side wall 32 of the camper when the two are secured together in the position shown in FIG. 1; other slotted arrangements could be provided. A similar type arrangement such as the gasket material 54 may be provided on the inner side surfaces of the front wall 34 so as to provide a tight seal with the front edge of the side walls 32.

As can be readily seen, the latches 48 may be released by a simple operation and the top wall 34 flipped over onto the top surface of the main section of the camper 16. With such disposition, the front wall 34 is folded onto the windshield 50 of the pickup truck 14 as shown in FIG. 2. The window 24 thus provides visibility for viewing from the windshield of the camper vehicle through the windows 24. However, it is not intended that the vehicle be driven with the camper in the position shown in FIG. 2, but it is only illustrated for purpose of showing the visibility of a person sitting in the cab of the vehicle 14 with the compartment exposed.

Referring now to FIG. 3 there is shown an alternative embodiment of the camper section of FIGS. 1 and 2. In FIG. 3 additional movement to allow still further opening of the convertible camper is provided. In FIG. 3, side walls 62 are movable so that they are flush with the rear surface of the camper portion 16. Mounted on the side walls 64 of the camper are track members 66. These track members 66 are positioned such that they are mateable with a slotted track 68 formed on the inner surface of the side walls 62. Thus, after the top wall 36 and the front wall 34 have been folded, the side members 62 may be made slidable along the side walls of the camper to provide still further openings for the cab-over section in the manner as depicted in FIG. 3.

Furthermore, in this embodiment, the front wall 34 is not folded down onto the windshield but extends horizontally from the bottom surface 44 of the cab-over section to provide increased "floor" space. The front wall 34 is supported in this position by a plurality of legs 63, 65 and 67 fitted top and bottom with rubber flanges such as at 69, 71, 73 and 75.

Referring now to FIG. 4 there is shown still a further arrangement for increasing air exposure to the cab-over section. In FIG. 4, the side walls 72 are secured at their bottom edge 74 to the bottom surface 44 of the cab-over section by means of a piano hinge 76 or other type of similar arrangement. Thus, after the top wall 36 and the front wall 34 are folded down in a manner described with respect to FIGS. 1 and 2, the side walls 72 may then be folded down and further exposure to the air is provided. In addition, gasket material 78 or other sealing arrangements are provided at the rear of the section 72 so as to allow a weather proofing seal to be provided between the side sections 72 and the side walls of the camper 16. Moreover, latching or positioning means may be provided for the side walls 72, if necessary.

While the convertible camper has been depicted for use with a cab-over section it should be understood that the convertible camper is equally useful with other types of camping vehicles where open exposure to the air may be needed. Thus, the invention should not be considered to be limited to camper vehicles of the slide-in or chassis mounted types having a cab-over section over the vehicle driver's compartment.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

I claim:

1. A camper for use in combination with a vehicle having a cab, comprising:
a main camper housing member and a cab-over section extending from said housing member and positioned over said vehicle cab, said cab-over section defining an enclosed accommodation space and comprising a plurality of wall members and means for moving said wall members with respect to each other for exposing said accommodation space;
said cab-over section being defined by a roof wall and a front wall wherein said roof wall is latched to said front wall; and
hinge means for moving one of said walls with respect to the other wall when said latch is released.

2. A camper in accordance with claim 1 wherein said cab-over section further contains side walls, said side walls being movable with respect to said roof wall for further exposing said accommodation space.

3. A camper in accordance with claim 2 including tracks positioned on said camper housing member and wherein said side walls are slidably movable on said tracks.

4. A camper in accordance with claim 2 wherein said side walls are connected to the cab-over section by means of hinges wherein said side walls may be pivotably moved with respect to the remainder of said cab-over section.

5. A camper in accordance with claim 2 wherein one of said walls contains a window therein, said window being positioned adjacent a window of said vehicle cab when said accommodation space is exposed.

6. A camper for use in combination with a vehicle having a cab, comprising:
a main camper housing member and a cab-over section extending from said housing member and positioned over said vehicle cab, said cab-over section defining an enclosed accommodation space and comprising a plurality of wall members and means for moving said wall members with respect to each other for exposing said accommodation space;
said vehicle being formed with a hood extending from said cab section, and said cab-over section being defined by a roof wall and front wall;
hinge means wherein said front wall is movable from said roof wall to a position over and spaced from said hood; and
means for supporting said front wall over said hood.

* * * * *